US010115149B1

(12) United States Patent
Deem et al.

(10) Patent No.: US 10,115,149 B1
(45) Date of Patent: Oct. 30, 2018

(54) VIRTUAL WORLD ELECTRONIC COMMERCE PLATFORM

(71) Applicant: Amazon Technologies, Inc., Seattle, WA (US)

(72) Inventors: Michael Eric Deem, Redmond, WA (US); Kumar J. Brahnmath, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 966 days.

(21) Appl. No.: 14/575,840

(22) Filed: Dec. 18, 2014

(51) Int. Cl.
*G06Q 30/00* (2012.01)
*G06Q 30/06* (2012.01)
*G06T 19/00* (2011.01)

(52) U.S. Cl.
CPC ....... *G06Q 30/0643* (2013.01); *G06T 19/003* (2013.01); *G06T 2200/24* (2013.01); *G06T 2219/004* (2013.01)

(58) Field of Classification Search
CPC .............. G06Q 30/0643; G06T 19/003; G06T 2200/24
USPC ....................................................... 705/27.2
See application file for complete search history.

(56) References Cited

U.S. PATENT DOCUMENTS

| | | | | |
|---|---|---|---|---|
| 6,414,679 B1 * | 7/2002 | Miodonski | .......... | G06F 17/5004 345/420 |
| 8,205,158 B2 * | 6/2012 | Ganz | .................. | G06Q 30/0643 715/706 |
| 8,332,781 B2 * | 12/2012 | Finn | ........................ | G06Q 30/02 705/14.66 |
| 8,433,656 B1 * | 4/2013 | Evans | .................... | G06F 21/629 463/29 |
| 2005/0105776 A1 * | 5/2005 | Luo | ..................... | G06K 9/00664 382/115 |
| 2009/0077025 A1 * | 3/2009 | Brooks | .............. | G06F 17/30867 |
| 2010/0138455 A1 * | 6/2010 | Alewine | ................. | A63F 13/75 707/803 |
| 2010/0188503 A1 * | 7/2010 | Tsai | ........................ | G01C 21/20 348/142 |
| 2011/0227938 A1 * | 9/2011 | Lan | ........................ | G06T 15/005 345/581 |
| 2012/0050257 A1 * | 3/2012 | Clarke | .............. | G06F 17/30893 345/419 |
| 2012/0151343 A1 * | 6/2012 | Garner | ................. | G11B 27/105 715/716 |

(Continued)

*Primary Examiner* — Yogesh C Garg
*Assistant Examiner* — Lalith M Duraisamygurusamy
(74) *Attorney, Agent, or Firm* — Lee & Hayes, PLLC

(57) ABSTRACT

A virtual world e-commerce platform enables creation of virtual worlds that allow users to explore virtual scenes populated with virtual objects. During this exploration, the users may identify physical items of interest for purchase, which the users may access at least partly via the virtual world. For example, when a user finds a virtual object that the user desires, the user may select that virtual object or otherwise interact with the virtual object to engage in an e-commerce transaction to consume a corresponding real-world item. The item may be physical item that is shipped to the user, a digital item, a service, and/or other types of consumable items. In some embodiments, the user may be able to consume the item within the virtual world. Virtual content may be tagged, which may allow associations to other virtual content and/or to real-world items.

20 Claims, 10 Drawing Sheets

(56) References Cited

U.S. PATENT DOCUMENTS

| | | | |
|---|---|---|---|
| 2012/0290591 A1* | 11/2012 | Flynn | G06F 17/30247 |
| | | | 707/754 |
| 2013/0226865 A1* | 8/2013 | Munemann | G06F 17/30864 |
| | | | 707/609 |
| 2014/0002496 A1* | 1/2014 | Lamb | G06F 3/14 |
| | | | 345/633 |
| 2014/0129354 A1* | 5/2014 | Soon-Shiong | G06Q 30/06 |
| | | | 705/16 |
| 2014/0267414 A1* | 9/2014 | Conlan | G06T 19/006 |
| | | | 345/633 |
| 2015/0097767 A1* | 4/2015 | Park | G06T 15/20 |
| | | | 345/156 |

* cited by examiner

VIRTUAL WORLD ELECTRONIC COMMERCE PLATFORM

BACKGROUND

Manufacturers continue to develop computing hardware having increased processing capabilities. Many electronic commerce sites still use hierarchically structured catalogs that are browsed primary though use of text-based searches and interaction with the hierarchy. These sites greatly rely on use of text that is displayed to customers in abundance. Images, meanwhile, are typically limited in quantity and surrounded by text. As an example, a typical item detail page for a product offered for sale typically includes a few images of an item offered for sale and a significant amount of supporting text that describes the product, the features, the price, and so forth.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
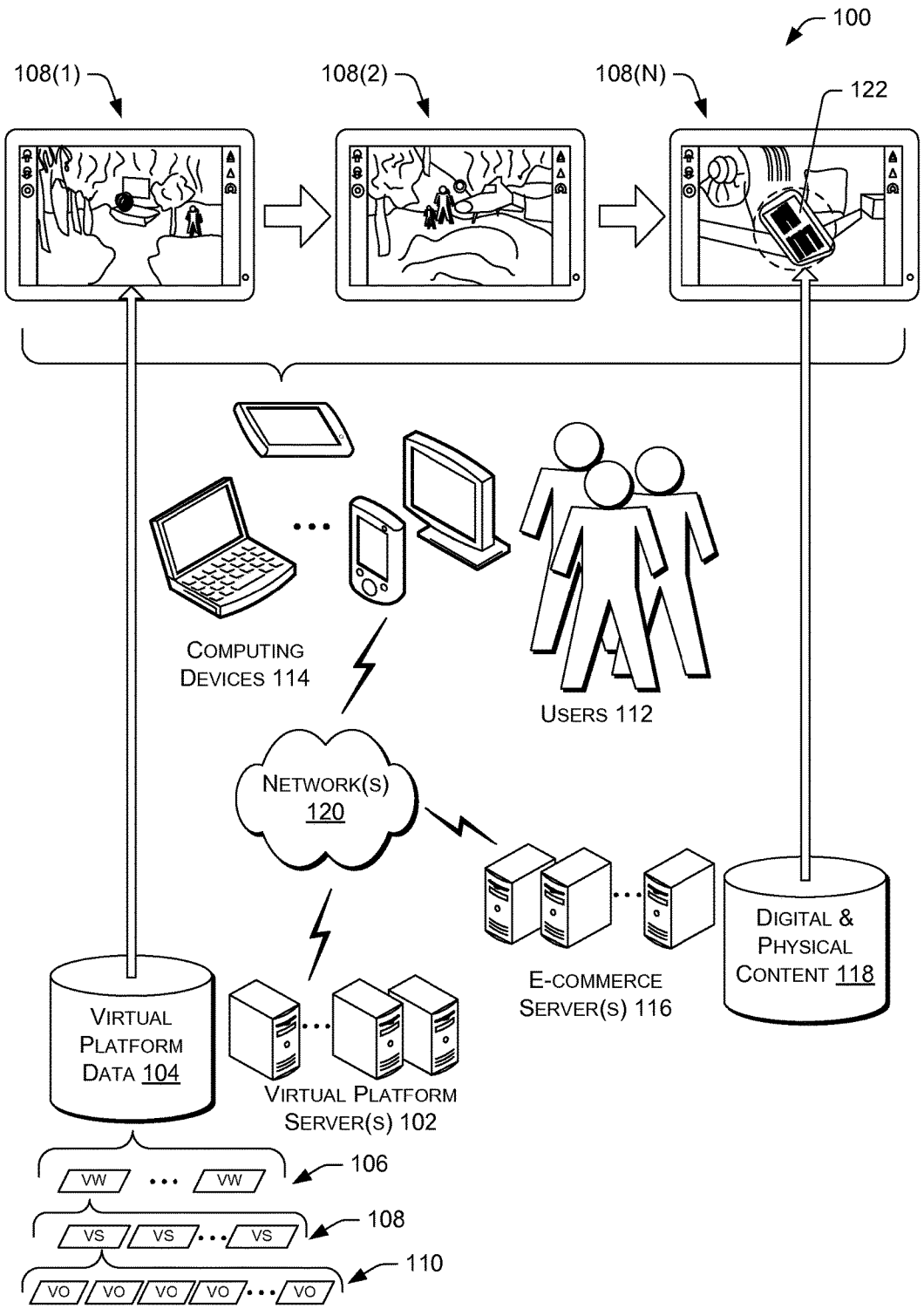
FIG. 1 is a schematic diagram of an illustrative computing environment usable to provide a virtual world electronic commerce (e-commerce) platform.

This disclosure is directed to a virtual world e-commerce platform that enables creation of virtual worlds that allow users to explore virtual scenes populated with virtual objects. During this exploration, the users may identify goods and/or services (collectively referred to herein as "items") of interest, which the users may access via the virtual world. For example, when a user finds a virtual object that the user desires, the user may select that virtual object or otherwise interact with the virtual object to engage in an e-commerce transaction to consume a corresponding real-world item. The item may be physical item that is shipped to the user, a digital item, a service, and/or other types of consumable items (e.g., credits, tokens, documents, videos, music, etc.). In some embodiments, the user may be able to consume the item within the virtual world, such as viewing or sampling digital media by manipulating a virtual television, a virtual tablet computer, a virtual boom box, and/or other virtual devices. As an example, the user may see a poster of a movie that is of interest to the user. The user may interact with the poster and cause a nearby virtual projector to show a trailer for the movie or another sample of the movie.

The virtual world e-commerce platform may leverage a community of professionals, enthusiasts, users, and others, as well as software to generate at least some of the virtual scenes. These virtual scenes may be created using toolkits and then published to the virtual world e-commerce platform.

The virtual scenes and their virtual objects may be analyzed to associate tags (e.g., metadata) to the virtual scene and/or the virtual objects within the virtual scenes. The tags may be used to associate the virtual content with real-world digital items or physical items available for consumption. The tags may also be used to associate or stitch a virtual scene to other scenes within the virtual world e-commerce platform, forming virtual worlds. Virtual worlds may also be connected through portals accessible within virtual scenes and/or accessible in other locations (e.g., a user interface, a menu, a pathway, etc.).

In some embodiments, the virtual world e-commerce platform may provide a customized experience for a user by selecting and providing virtual scenes and/or virtual objects to the user based on the user's interaction in the virtual platform and/or based on a profile of the user. For example, historical data associated with the user may be leveraged to create a profile for the user. The historical data may include past purchases, past browsing, past interaction with the virtual world e-commerce platform, user preferences, and/or other historical data. In this way, the virtual world e-commerce platform may provide a more engaging experience for the user by providing virtual scenes to the user that are likely of interest to the user, while balancing aspects of discovery of new virtual scenes and new virtual objects. The virtual world e-commerce platform may also enable the user to modify aspects of the virtual scenes, such as by providing user input about associations, tags, or other content, adding or removing content (which may or may not impact the virtual scene for other users), and/or by enabling other customization. In some embodiments, a user may add a virtual object, which corresponds to a real-world object offered for sale, to a virtual scene. For example, the user may want to add a virtual object to a virtual room to see how the object looks with the other objects. If adequately satisfied, the user may then decide to purchase or acquire the real-world object, possibly through use of the virtual world e-commerce platform.

As an example, at least a portion of the virtual world e-commerce platform may model a virtual bookstore. For example, imagine an immersive virtual bookstore that is accessible via a user's smart phone or tablet computer. In the virtual bookstore, the user may see a marbled and columned rotunda with stacks of books in the distance, but nearby alcoves are filled with colorful 3D scenes that catch a user's eye, each dedicated to a genre: a sunset beach for romance, a gothic dungeon for horror, a surface of an alien planet for sci-fi, as so forth. The user may tilt her device to change a view or navigate/move within the virtual bookstore, and then may select things that appeal to the user. The user may move into the selected scene, and sub-genres or individual books may be presented in similar sub-groupings, as appropriate for the selected genre and possibly as recommendations based on the user's historical data and prior interactions. Perhaps ancient artifacts on the alien world show glimpses into other times and places, or paths leading from that beach extent to the jungle, city or mountains, each allow the user to discover new books of interest.

As another example, the virtual world e-commerce may guide a user through virtual scenes that show vacation themed adventures. As the user interacts with the scenes, the user may be guided to a next scene based at least partly on levels of interest shown in previous scenes. For example, a scene may include a beach scene in Hawaii that has personal sailboats, kayaks, and paddleboards for use on the beach. The scene may include waves crashing on the beach, surfers in the ocean, and other animations that engage the user. When the user interacts with a kayak, the next scene may include another kayak adventure, but this time in a new location such as in the fjords of New Zealand with the towering glacial carved mountains looming above. The scenes may immerse a user and allow the user to hone it on an ideal vacation. The virtual world e-commerce platform may facilitate selection and booking of a vacation, or other services, through use of the virtual world e-commerce platform.

The techniques and systems described herein may be implemented in a number of ways. Example implementations are provided below with reference to the following figures.

FIG. 1 is a schematic diagram of an illustrative computing environment 100 usable to provide a virtual world e-commerce platform. The environment 100 includes a virtual platform server 102 that enables creation of virtual platform data 104. The virtual platform server 102 enables rendering of one or more virtual worlds 106 using the virtual platform data 104 to allow exploration of the virtual worlds 106 by users 112 via respective computing devices 114. The virtual worlds 106 may include virtual scenes 108, which may in turn include virtual objects 110. The users 112 exploring a virtual world may move through different virtual scenes and interact with different virtual objects, associated with different real-world items, within those virtual scenes. The virtual worlds 106 may be organized by different themes, genres, types of associated items, or in other ways. For example, a first virtual world may be associated with a book store and may include first virtual objects associated with first real-world items while a second virtual world may be associated with sporting adventures and may include second virtual objects associated with second real-world items. As another example, a first virtual world may be associated with a first book (e.g., first real-world item) while a second virtual world may be associated with a second, different book (e.g., a second real-world item). However, the virtual worlds 106 may include almost any type of information, and thus may be defined in many different ways, creating flexibility in the development of the virtual world e-commerce platform.

The virtual platform server 102 may also enable access to e-commerce servers 116 that provides real-world digital and physical content 118 associated with virtual objects in the virtual world 106 using a tagging structure, which is discussed in more detail below. The digital and physical content 118 may include digital items that can be accesses within the virtual world, such as digital books, videos, music, and/or other digital content. The digital and physical content 118 may include information about real-world physical items (i.e., goods and/or services) that can be identified by exploration of the virtual world 106 and consumed by users, such as through at least partial use of the e-commerce servers 116. The virtual platform server 102, computing devices 114, and e-commerce servers 116 may exchange information via one or more networks 120, which may include wired and/or wireless networks to accommodate a distributed arrangement of computing resources and hardware.

As discussed, the virtual worlds 106 may include various virtual scenes 108. At least some of the virtual scenes 108 may be created by professional designers, enthusiasts, and/or users of the virtual platform. Some virtual scenes may be generated, at least partly, using existing information, such as using storylines from books, movies, and/or other information. For example, a virtual scene may represent a scene from a book, such as a scene from Hogwarts from the book series "Harry Potter," by J. K. Rowling. Computer-based analysis of the book may be used to generate information used to help generate the scene, such as to identify objects included in the scene. The virtual scene includes some of the virtual objects 110, which may include characters, landscapes, props, and virtual instances of man-made things, such as furniture, tools, toys, books, electronic devices, and so forth. Some of the virtual objects 110 may be manipulated to provide information and/or entertainment to a user. For example, a virtual tablet computer may be used to play a digital movie or allow the user to read a digital book while interacting within the virtual world. Some of the virtual objects may be generated by the professional designers, enthusiasts, and/or users of the virtual platform. Virtual objects may be made available for other users, via a marketplace or library, to add to the virtual scenes. In some embodiments, the platform may access a textual description from a book. The platform may identify the virtual object using the textual description from the book. The platform may select the virtual object for inclusion in the virtual scene. The platform may render the selected virtual object in the virtual scene.

The virtual world 106 may be rendered for exploration by a user via one of the computing devices 114. The computing device 114 may be associated with a user profile of the user 112. The user profile may be a user account, which may be accessed after providing credentials. An illustrative rendering is shown by way of user-exploration of a series of virtual scenes 108(1), 108(2), . . . , 108(N), which represent snapshots of an exploration within a virtual world. The user may begin the exploration at a first virtual scene 108(1), which may be selected as a home scene, an arbitrary location, a location resulting from a search, or determined in other ways. The user may interact with virtual objects within the first virtual scene 108(1) and/or move to a second virtual scene 108(2). The second virtual scene 108(2) may be related to the first virtual scene 108(1) through metadata, such as by associations in a tagging structure. The user may move to the second virtual scene 108(2) by navigating an avatar, selecting objects/destinations, and/or providing other inputs. The user may arrive at a last virtual scene 108(N), which may include a virtual digital player device 122. The user may interact with the virtual digital player device 122 to access digital content (e.g., a sample of an electronic book), which is made available in the virtual world via the virtual digital player device 122. The user's exploration through the virtual world may be provided by a 3D rendering engine that creates smooth transitions between the various scenes, which may be connected by pathways or otherwise have spatial relationships that are logical, intuitive, and resemble real-life relationships or common imaginary relationships (e.g., relationships found in popular games, movies, etc.).

Figure 2:
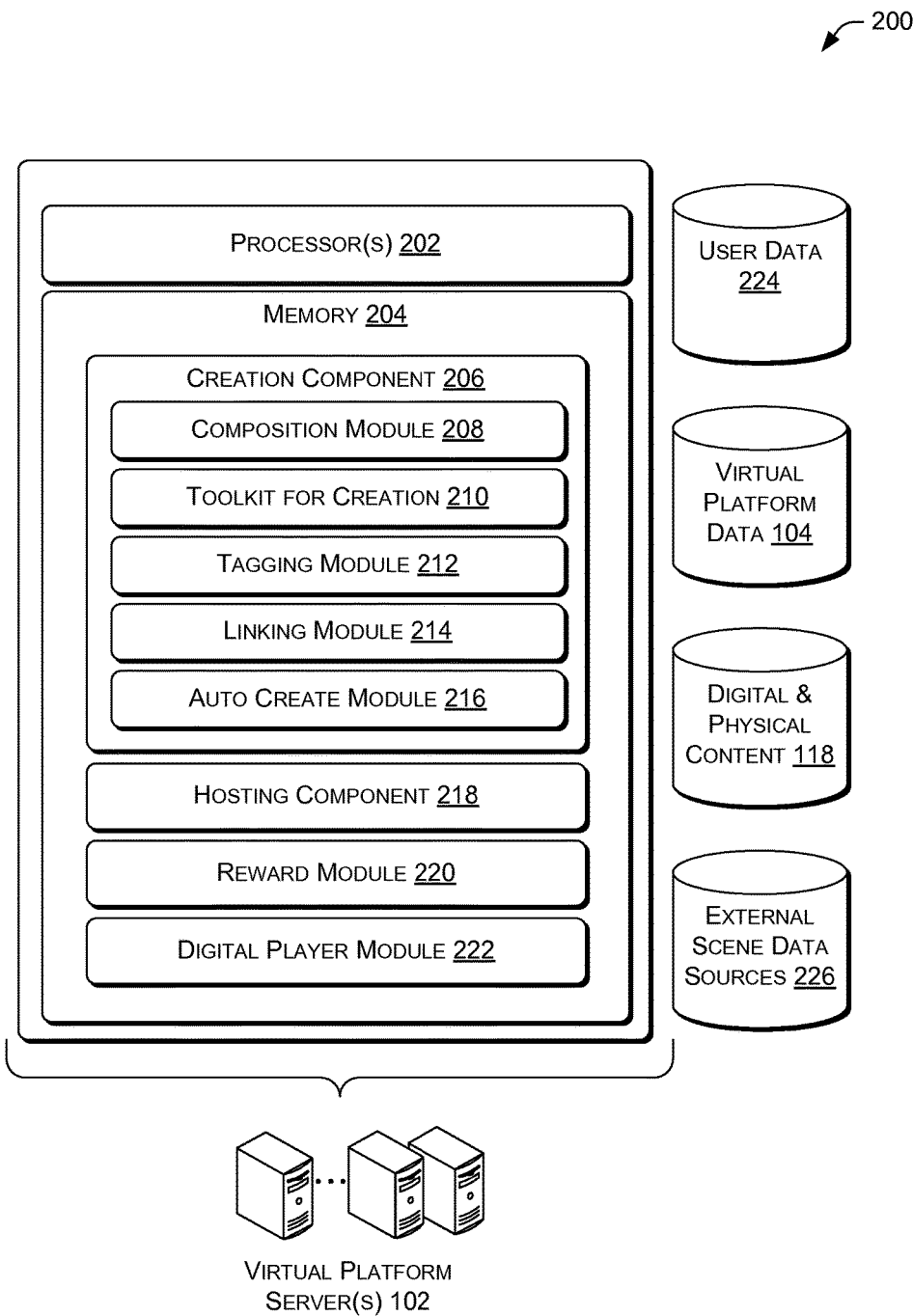
FIG. 2 is a block diagram of an illustrative computing architecture to support the virtual world e-commerce platform.

FIG. 2 is a block diagram of an illustrative computing architecture 200 of the virtual platform servers 102 to support the virtual world e-commerce platform. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a creation component 206, which may include a composition module 208, a toolkit for creation 210, a tagging module 212, a linking module 214, and an auto create module 216. The computer-readable media 204 may also store a hosting component 218, a reward module 220, and a digital player module 222. The components and modules are described in turn. The virtual platform servers 102 may have access to user data 224, the virtual platform data 104, the digital and physical content 118, and external scene data sources 226. The components/modules may be stored together or in a distributed arrangement.

The creation component 206 may enable professional designers, as well as enthusiasts and other users to create virtual worlds, create virtual scenes, and/or create objects, as well as possibly modify any of these creations, which may be part of the virtual platform data 104. In addition to creating content, the creation component 206 acts to associate the creations within the platform to enable users to interact with the creations. As discussed above, the creation module 206 includes various modules to assist in carrying out these operations, as discussed below.

The composition module 208 may enable creation of the virtual worlds, creation of the virtual scenes, creation of the objects, and modification of existing creations. Some content, called "stock content" may be pre-populated for use by creators. Stock content may include simple versions of many common objects that are made available for creators. Stock content may be created by sponsoring the creation of content by third party designers, such as those who are active in virtual communities. Some 3D models of products may be created through use of 3D imaging (e.g., photograph) and could be used as stock objects. The toolkit for creation 210 may be used by creators to assist in these tasks.

The toolkit for creation 210 may include a toolkit for creating virtual content, also referred to as "apps". Here, a device and/or web applications may allow users to create virtual object apps by aggregating and customizing virtual object apps created by others. The marketplace may provide a "royalty sharing" model for such apps. The toolkit for creation 210 may include a toolkit for creating worlds. Here, a device and/or web applications may allow customers to create virtual worlds by acquiring and arranging virtual objects, choosing who has access to their worlds, if and how the worlds are exposed through the platform, and if visitors are expected to "pay" for experience their world in some way. Many revenue models are possible: pay for permanent access, pay per-visit, pay after an extended visit, pay per-minute, subscriptions, donations, or via advertising. The payment may be made using dollars, tokens, credits, access keys, and/or other exchangeable instruments. Advertising take the form of banner ads in a viewer application and/or via "product placement" using objects in the virtual world. Other types of content may be provided to create awareness of products and/or digital content, such as by product placement. For example, music may be playing in a virtual scene and may be made accessible to a visitor, such as by interaction with a virtual object associated with the music (e.g., an album, poster, etc.). Other types of product placement may also be included, such as a movie playing on a virtual device, a branded object (e.g. beverage can, etc.), and so forth.

The tagging module 212 may associate tags with the created virtual worlds, virtual scenes, and/or virtual objects. The tags may include metadata and be used to associated the virtual creations with other virtual creations within the platform and/or associate the virtual creations with real-world e-commerce items, such as physical items for sale, digital items for consumption, services (i.e., real-world and/or virtual services), and other non-platform information. The tagging module 212 may enable creators to initially tag items and/or may leverage existing tags to auto-tag new objects or modified objects. The tagging module 212 may enable a community based process for tagging customer-created content as well as ways for customers to restrict the visibility of tagged objects or worlds based on their personal preferences. The tagging system may be fine grained, curated, and evolving. It may not be restricted to providing a single human rating for an item, but for identifying many attributes on the item (colors, styles, genres, etc.), which may be used to create any number of tags. For example, each attribute may be associated with a weight in a range (e.g., 0 to 1, meaning no association with the tag and a strong association with the tag, respectively). Individual customers may be able to set their tag preference values, such as by voting. For example, a virtual bookstore and virtual object marketplace may use this data to enable a "browse by emotion" metaphor to help customers find what they are looking for in the real world through exploration in the virtual world. The tags and/or weights of the tags may be updated over time based on user activity, voting, and/or other factors. Thus, a weight for each tag may be generated based on user interaction with each tag by users, for example.

The linking module 214 may create links using the tags, which associate one or more of the virtual objects, the virtual scenes, and/or the virtual worlds. For example, a virtual world may be associated with a virtual scene in another world, which may cause inclusion of a portal in the virtual scene that enables access to the other virtual world. The linking module 214 may also use the tags to link objects to physical items for sale, digital items for consumption, services (i.e., real-world and/or virtual services), and other non-platform information.

The auto create module 216 may leverage the external scene data sources 226 to identify information that can be used to assist with generation of the virtual worlds, the virtual scenes, and/or the virtual objects. For example, the external scene data sources 226 may include information that summarizes portions of books, movies, and/or other publications and can be used to create a detailed description of a scene from a source (e.g., a book), auto-populate a described scene, suggest virtual scenes for creation, and/or otherwise initiate creation of a virtual scene.

The external scene data sources 226 may leverage or otherwise incorporate user interaction to determine popular or important aspects of content. For example, an external scene data source may provide information about a popular series of books. The external scene data source may also contain information about a popularity of certain parts of the content, scenes, chapters, characters, actions, and so forth, based at least in part on user interaction with the source and/or through other sources, such as through analysis of messages from social media sites, for example. Thus, a corpus of users of the external scene data sources, after interaction with content, may provide data and/or indication of what content or portions of content are ideal for use as virtual objects, virtual scenes, and/or virtual worlds.

As a possible implementation, an electronic book reader application may enable users to annotate content in electronic documents, share content via social media, and/or track user interaction with portions of the content. The application may then use this information, which may be a textual description from a book, to determine an importance of the content and/or portions of the content, which may be used to determine whether to create virtual objects, virtual scenes, and/or virtual worlds using the content or portions thereof. Thus, this textual description may be used to identify virtual objects and select the virtual objects that may then be rendered in a virtual scene.

The hosting component 218 may host and/or render the virtual platform to enable users to explore the content created via the creation component 206. In some embodiments, the hosting component 218 may be a real time message exchange system that coordinates the activities of avatars (or users) and the dynamic objects in the world, as well as publishing pointers (e.g., uniform resource locators, etc.) to the resources (meshes, textures, etc.) used to render the world. This process can be run in a distributed network (e.g., using cloud services) to enable virtual worlds whose state is shared by multiple viewers or to move processing load off of low end devices. It could also be hosted on capable devices for private experiences, and thus rendered by the local user device. Peer-to-peer architectures are also possible, allowing for "instanced" multi-user game worlds. In some embodiments, a world may have a transient state, which may only exist when it is in active use by one or more customers, and a persisted state, which would likely be stored as a document. Thus, inactive virtual worlds may consume almost no resources.

The hosting component 218 may implement a composition process that assembles and manages the scene graph and resources needed for each viewing device. For some devices, this process could run in a distributed network of computing devices and stream rendered video to the user device. For others, it could run on the device itself. Hybrid approaches are also possible, e.g. rendering background content in the cloud and streaming it to multiple devices, which then render the local perspective on top of background image.

In various embodiments, the hosting component 218 may also implement a resource conversion and bundling system that translates the industry standard resources provided with virtual object apps into the formats used by the platform. This system may also bundle the resources needed for a particular world into the optimal number of device specific downloads. By minimizing the number of downloads, and by placing commonly used resources into bundles that can be cached on the device, the impact of the connection latency incurred on mobile devices may be lessened or minimized.

In some embodiments, the hosting component 218 may leverage the user data 224 to provide a customized viewing and/or exploration through the virtual worlds, via the linking module 214. For example, the hosting component 218, via the linking module 214, may provide a custom association between scenes that is based on the user data to introduce scenes to the user that are likely of interest to the user. The scenes may be selected based in part on the user's interaction in the virtual world, which may be stored in the user data 224. The scenes may be selected based in part on previous user purchase, user profile information, user browsing history, and/or other historical data associated with the user via a user profile.

The reward module 220 may provide a reward to creators of content when the content is used by other users, when items are purchased or consumed through use of the content, for submission of content, and/or for other tasks. The rewards module 220 may provide credits, bonus features, ratings, reviews, tokens, money, and/or other types or rewards or combinations of rewards for different activities performed by contributing to the platform and/or exploring within the platform.

The digital player module 222 may enable digital items to be played in the virtual worlds and virtual scenes, such as via a virtual digital player. For example, a scene may include an object that is a virtual digital player associated with one or more digital content (e.g., an electronic book, a video, music, etc.). The user may engage with the virtual digital player to cause the digital player module 222 to play the digital media. In some embodiments, the platform may invoke an external application to view or otherwise interact with the digital item. For example, the platform may cause a music player application to launch and then play digital music.

FIGS. 3, 4, and 6-9 are flow diagrams of illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
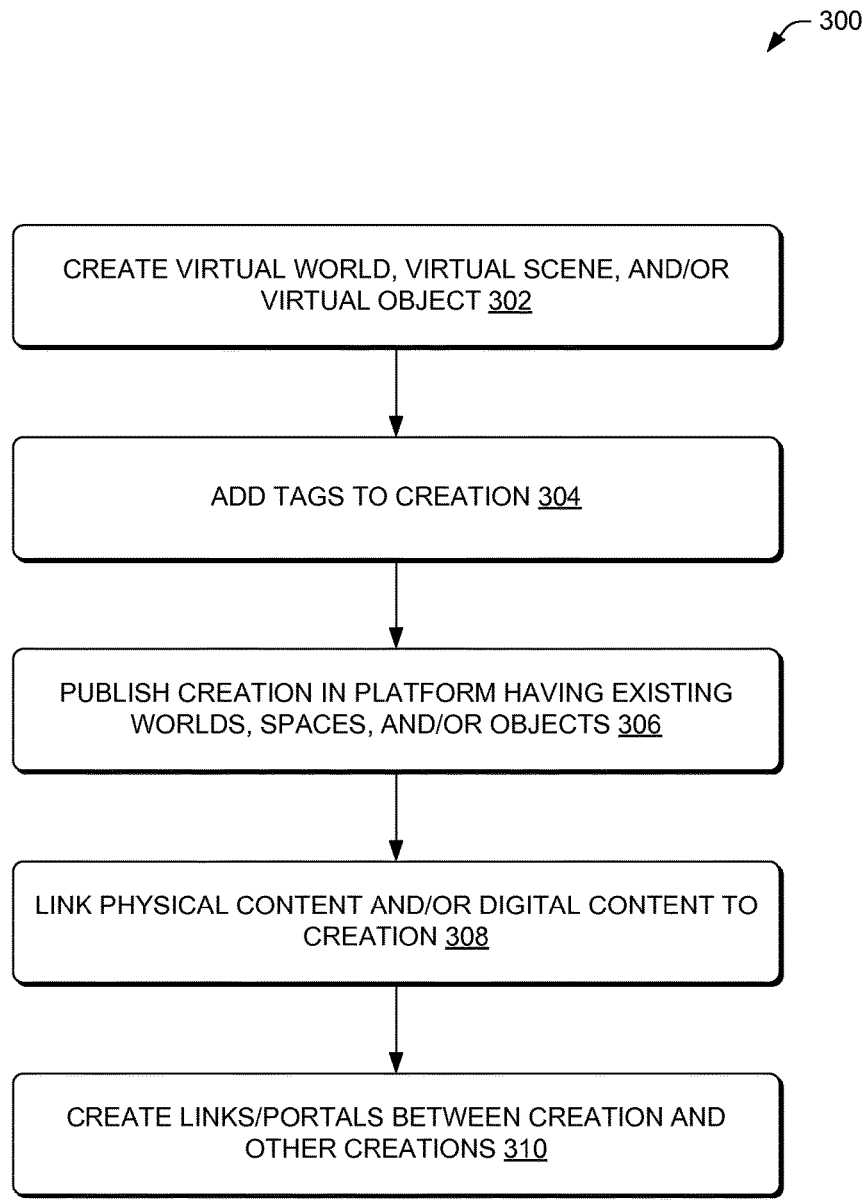
FIG. 3 is a flow diagram of an illustrative process to create virtual content and publish the virtual content for inclusion in a virtual world e-commerce platform.

FIG. 3 is a flow diagram of an illustrative process 300 to create virtual content and publish that content for inclusion in a virtual world e-commerce platform. The process 300 is described with reference to the environment 100 and the computing architecture 200, and may be performed by the virtual platform servers 102.

At 302, the creation component 206 may be used to create a virtual world, a virtual scene, and/or a virtual object, which may be included with other created content into the virtual platform. For example, professionals, enthusiasts, and users may interact with the various modules of the creation component 206 to create content for the virtual platform. In some embodiments, some content may be at least partially created automatically via the auto create module 216 by leveraging external scene data sources, such as sources that provide scene data for books, movies, and/or other media.

In some embodiments, the creation (or modification) of the virtual world may include receiving a virtual scene for rendering in a virtual world. The virtual scene may be associated with at least some content from a book and may comprise an interactive media file that facilitates three-dimensional virtual exploration by users that access with the virtual world through a virtual world e-commerce platform. The virtual world being a collection of virtual scenes. A virtual object may be determined to be placed in the virtual scene. The virtual object may mimic a real-world item. In some embodiments, the virtual object may be a virtual electronic book. In response to determining the user selected the virtual electronic book, the device can be configured to initiate an electronic book reader application (or other type of rendering module configured to present content associated with the electronic book) and provide a sample of the book to the user. Additionally or alternatively, selecting the virtual object may cause one or more other types responses by the device, including determining the virtual object is associated with audio, an item for sale in an online store, a geographic location, contact information (e.g., telephone number or email address), or any other type of actionable information. After determining the type of actionable information associated with the virtual object, the device can provide the necessary service (e.g., in the virtual world or by executing coded instructions that are independent of the virtual world). For example, in response to detecting a selection of the virtual object and determining the type of virtual object, a multi-media player can be provided for playing audio/video, an online store can be accessed, a digital map can be provided that shows the location of a real world store or other type of object, a messaging/telephone service can be provided, etc.

At 304, the tagging module may be used to add tags to the creations based on user selection of tags, user voting, object attributes, and/or other information. The tags may include metadata that describes attributes of a virtual object (and/or possibly the virtual scene and/or virtual world) and that enables linking the tags to other similar tags, thereby linking virtual scenes and possibly linking a virtual scene to a different virtual world. The tags may also link virtual content to real-world content offered by third parties, such as by the e-commerce servers 116.

At 306, the creation component 206 may publish the tagged creation to the virtual platform. The creation component 206 may make the tagged creation available for private use by the creator, for public use, and/or for special, restricted use, which may be determined by the creator or others.

At 308, the linking module 214 may link at least some of the virtual objects in the virtual scene to physical items and/or digital content. For example, a movie poster in a scene may be linked to a digital version of the movie, which may be available for at least partial consumption within the virtual scene (e.g., via a virtual movie player). Another virtual object may be associated with a good offered for sale by an e-commerce server while yet another virtual object may be associated with a real-life or virtual service offered by yet another provider. In some embodiments, the linking module 214 may identify a real-world item offered for sale using the tag and a textual description of the real-world item, such as text displayed on a cove of a book or electronic book. The real-world item being a consumable version of the book (described above). The linking module 214 may create a link between the virtual object and the real-world item offered for sale to enable purchase of the real-world item (e.g., the book, etc.)

At 310, the hosting component 218 and/or the linking module 214 may associate the creation with other virtual worlds, virtual scenes, and/or virtual objects based on the tap included in the creation. The associations may create a network of virtual scenes that can be explored by a user during interaction with the virtual platform. In some embodiments, the linking of virtual scenes may be performed in real-time during exploration by a user, and may be based on the user data 224 and/or user interaction in the virtual scenes. Portals may enable a user to move from a first virtual world to a second virtual world, where the first virtual world and the second virtual world may include different themes, different item associations, and/or other differences. For example, the first virtual world may be associated with a first group of real-world items while the second virtual world may be associated with a second group of real-world items.

In various embodiments, the hosting component 218 may render of the virtual world to enable a user to explore the virtual scene. In some embodiments, the hosting component 218 may render the virtual scene for a user based at least in part on (i) a prior virtual scene visited by the user and (ii) user historical data representing interests of the user. The hosting component may provide access by the user, in response to interaction with the virtual object, to at least one of (i) the sample of a book through interaction with the virtual object or (ii) the real-world item offered for sale (e.g., a physical version of the book, an electronic version of the book, a movie adaptation of the book, etc.).

Figure 4:
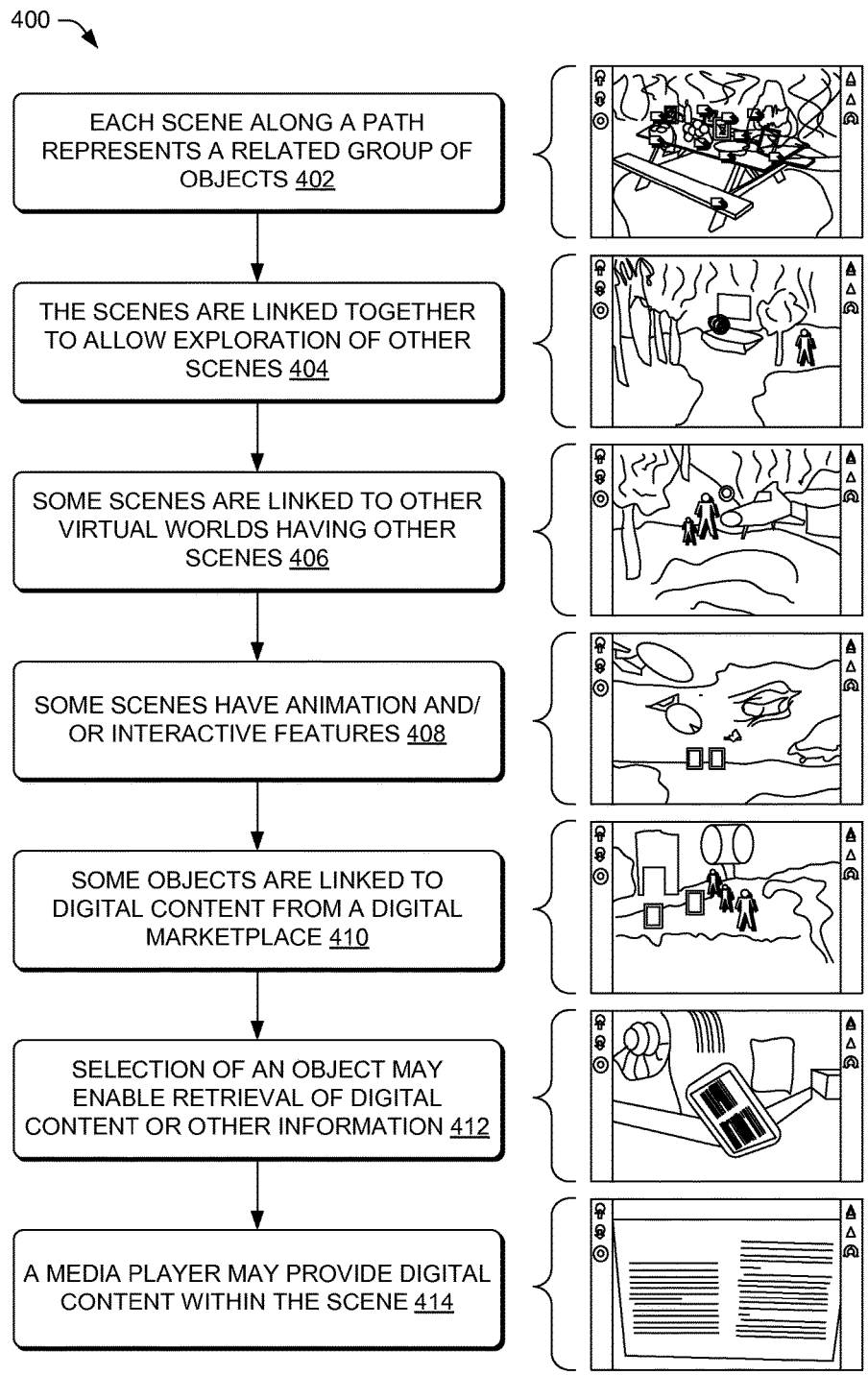
FIG. 4 is a pictorial flow diagram of an illustrative process to explore the virtual world e-commerce platform.

FIG. 4 is a pictorial flow diagram of an illustrative process 400 describing exploration of part of the virtual world e-commerce platform. The process 400 is described with reference to the environment 100 and the computing architecture 200, and may be performed by the virtual platform servers 102.

At 402, a first virtual scene is provided along a pathway that links multiple scenes together to facilitate exploration by a user. The first virtual scene may include a picnic theme with a related group of virtual objects that include tags used to link to information and items related to picnics. The user may explore the virtual scenes using an avatar or in a first person mode without an avatar. In some embodiments, the user may see other users who are exploring a same scene. When other users are exploring the same scene, the number of users may be limited to avoid cluttering of the scene. For example, the scene may have ten visitors, but a user may only see two of the users where the other seven are hidden to avoid cluttering the scene. In various embodiments, the user may explore scenes without interaction or appearance of any other users or avatars. In some embodiments, pathways between virtual scenes and/or entrances to virtual scenes may show "wear" based on the popularity of the path or virtual scene, such as based on the number of visitors that travel down that particular path. For example, a new virtual scene may have a new looking door or entrance while an old and popular virtual scene may have an old looking and worn door and/or entrance.

At 404, a second scene is visible, which is linked to the first scene and may be explored following a visit to the first scene or possibly without visiting the first scene. In some embodiments, the second scene may be linked to the pathway in response to user interaction (selections, time viewing, etc.) with some virtual objects in pervious scenes. For example, if the user interacted with a virtual animal in one scene, then other scenes linked to the pathway may be selected for including virtual animals or other related virtual objects, such as a safari scene, a zoo scene, etc.

At 406, the user may access a scene that includes a portal to another virtual world. The portal may move the user from a first virtual world having a first theme to a second virtual world having a second theme. For example, the first theme may be related to jungles while a second theme may be related to space exploration and inter-galactic travel.

At 408, a scene may provide animation and/or other motion, audio, and/or immersive features that encourage user interaction within the scene. For example, virtual characters may move in response to movement of the user's avatar. The movements may act out part of storyline, such as an animated scene from a book or movie.

At 410, the user may interact with objects that are linked to other physical content or digital content, which may be consumed by the user inside the virtual scene and/or outside of the virtual platform, such as via an e-commerce server.

At 412, a virtual object linked to digital content may be selected by the user while interacting within a virtual scene. The virtual object may be a virtual digital player, such as an electronic book reader or tablet, or may be another object like a poster or image.

At 414, the virtual object may provide at least a portion of the digital content for consumption by the user in the virtual scene. For example, a virtual electronic book reader device may be presented in the display with content from a book associated with the scene or otherwise associated with the virtual objects. In some embodiments, the digital content may be purchased through the virtual platform and made accessible outside of the virtual platform. The digital content may include documents, videos, music, concerts, games, puzzles, and/or other types of digital content capable of consumption by users. In some embodiments, the platform may receive an indication that a real-world item was purchased. The indication may cause an update to the platform, generation of a reward, and/or other actions by the platform.

Figure 5:
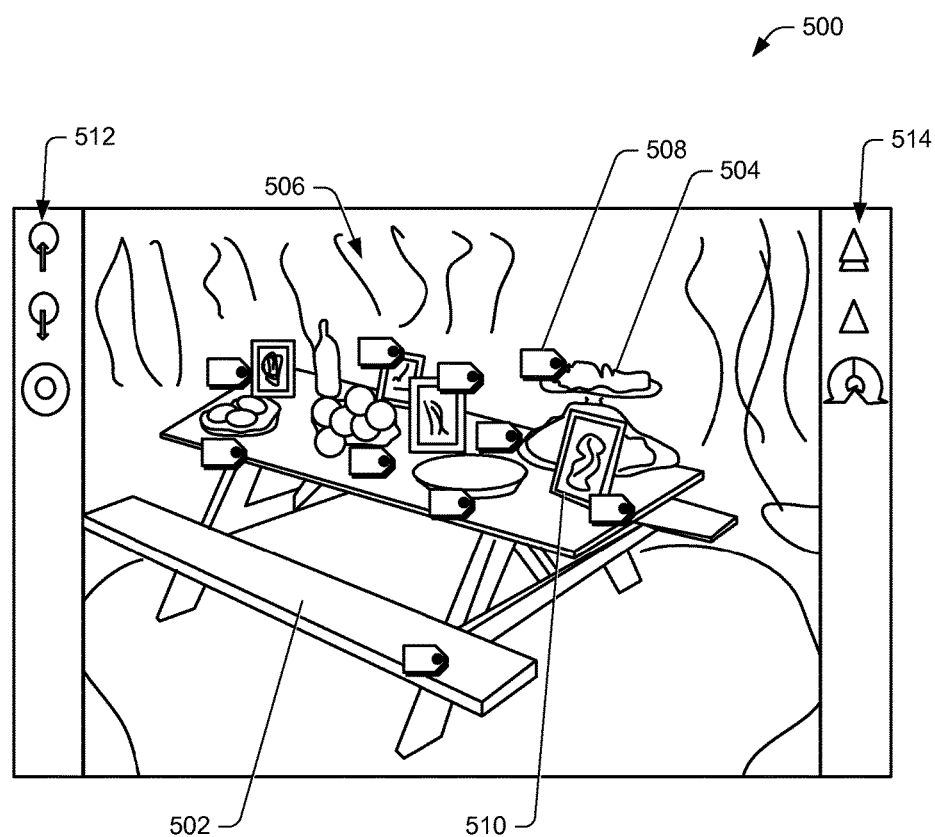
FIG. 5 is an illustrative virtual scene within a virtual world. The illustrative virtual scene includes virtual objects that are associated with other content through tags. A user can interact with virtual objects in the virtual scene or navigate to other virtual scenes within the virtual world, which may be associated by the tags.

FIG. 5 is an illustrative virtual scene 500 within a virtual world. The illustrative scene includes virtual objects that are associated with other content through tags. A user can interact with objects in the scene or navigate to other scenes within the virtual world, which may be associated using the tags.

The illustrative virtual scene 500 may include one or more props 502, such as a picnic table shown in the virtual scene 500 that relates to a picnic scene. The prop(s) 502 may include virtual objects 504, which may be placed on or around the prop, or in other locations within the virtual scene 500. The virtual scene 500 may include a backdrop 506 and/or other imagery.

The virtual objects 504 may be associated with tags 508 which may include metadata to link a virtual object to items for consumption, to information about the items, to other virtual objects, to other virtual scenes, to other virtual worlds, and/or other information. Virtual digital players 510 may enable a user to access digital content within the scene or possibly for consumption outside of the virtual platform (e.g., for purchase). The link may be created by associating the tag of the virtual object with a textual description of the physical item.

The user may interact with interaction controls 512 that may be selectively available in a user interface (UI) or persistent in the UI. The user may interact with navigation controls 514 to facilitate movement within the virtual scene 500 and/or movement to other virtual scenes via a pathway or other route. In some embodiments, navigation input may be based on other inputs, such as based on accelerometer and/or camera inputs that identify a tilt of a device that is manipulated by a user, and then cause navigation in the virtual world based on the tilting of the device. In some embodiments, virtual scene 500 may include a portal to another virtual world that includes a theme associated with the virtual theme 500.

A creator of the virtual scene 500 may create the various props, virtual objects, and backdrop or may select at least some of the virtual objects from a library of available virtual objects (e.g., objects, props, backdrops). In some embodiments, the elements (e.g., virtual objects, virtual scenes, and/or virtual worlds) may be auto-generated based on a scene from a story, a movie, or other information. The creator may modify an existing virtual scene by adding or modifying tags, adding virtual objects, linking digital media to objects, and so forth. The user (visitor) of the virtual scene may also modify the virtual scene in some aspects, such as by moving virtual objects, voting on tags for the virtual objects, and possibly in other ways.

During exploration of the virtual scene 500 by the user, the user data 224 may be populated based on the interaction by the user with content in the virtual scene 500, which may create user data that is used to select other virtual scenes that later become available to the user via the pathway that connects the virtual scenes, for example.

Figure 6:
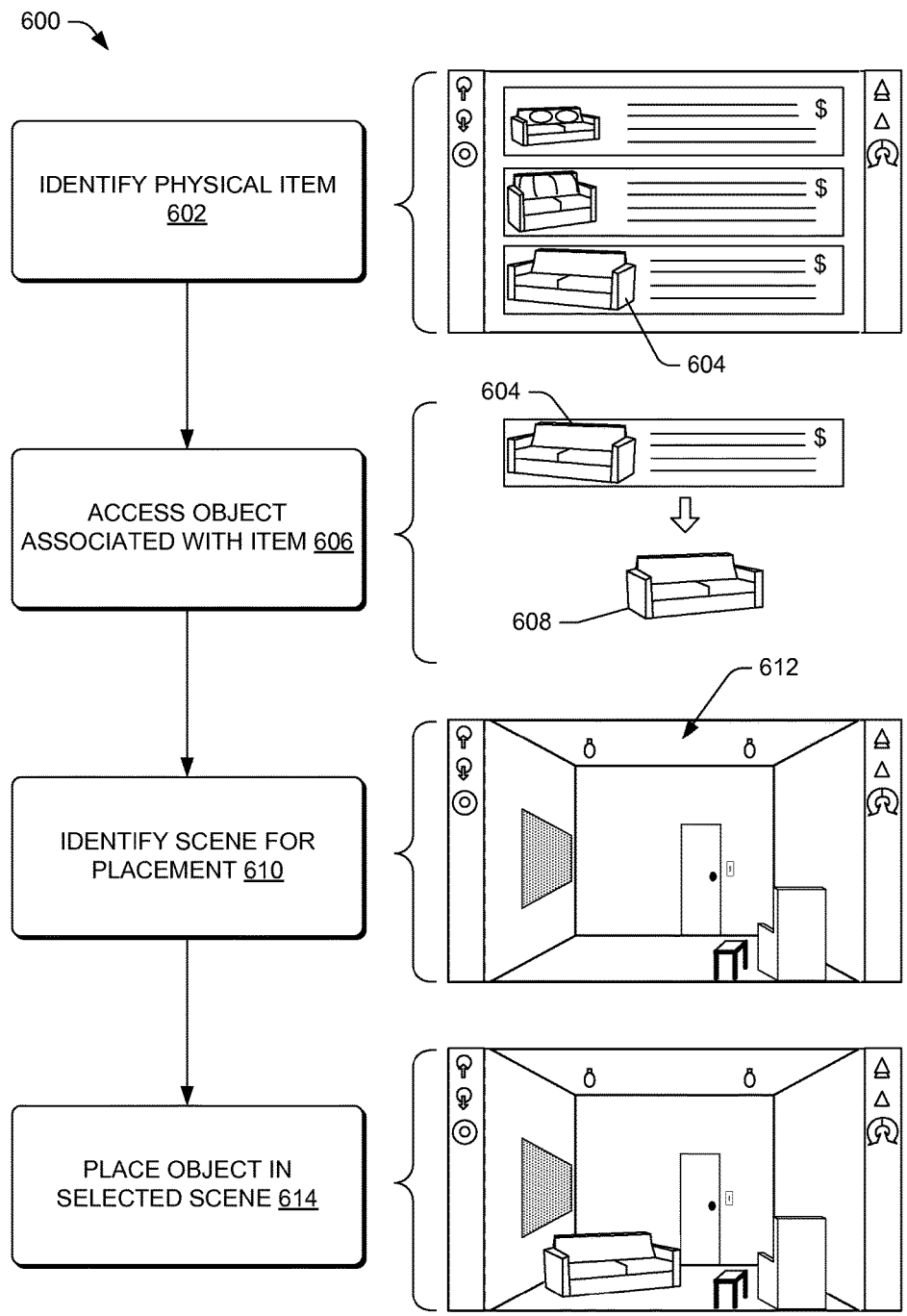
FIG. 6 is a flow diagram of an illustrative process to modify a virtual scene by adding virtual objects associated with e-commerce items.

FIG. 6 is a flow diagram of an illustrative process 600 to modify a virtual scene using objects associated with e-commerce items and/or other items. The process 600 is described with reference to the environment 100 and the computing architecture 200, and may be performed by the virtual platform servers 102. The process 600 may be used to generate new objects, sample real items in the virtual platform, among other possible uses. For example, a user of the virtual platform may want to add an item into a scene to see how the item looks with other items in the scene that are already owned by the user, such as in a virtual living room that resembles an actual living room occupied by the user.

At 602, the creation component 206 may identify a physical item 604 available from another source, such as from digital and physical content 118 from the e-commerce server 116, from the external scene data sources 226, and/or from other sources. The physical item 604 may be linked in the virtual platform to an existing virtual object stored in the virtual platform data 104.

At 606, the creation component 206 may access a virtual object 608 associated with the physical item 604 identified in the operation 602. The creation component 206 may leverage links and/or tags used to associate virtual objects in the virtual platform data 104 with external physical items, such as the physical item 604, to access the corresponding virtual object 608 associated with the identified physical item 604.

At 610, the creation component 206 may identify a virtual scene 612 for placement of the virtual object 608 that corresponds with the physical item 604. The virtual scene 612 may be a default scene associated with the user, a last scene visited by the user, or a different virtual scene. In some embodiments, the creation component 206 may enable creating a virtual scene by scanning or imaging a room or other real-world space to create the virtual scene. For example, a user may take various images of his living room, which may be converted into a rendered virtual scene by the creation component 206.

At 614, the creation component 206 may place the virtual object 608 in the virtual scene 612 identified at the operation 610. The user may modify attributes of the virtual object 608, such as the location of the virtual object 608 within the virtual scene 612, the size, shape, color, etc., such as by using controls in a UI. In some embodiments, the virtual object 608 may be visible to others that visit the virtual scene 612. For example, the user may ask other users whether the virtual object 608 coordinates with the virtual scene 612 in order to assist the user in making a purchase of the physical item 604 associated with the virtual object 608 (per the operation 606).

In some embodiments, the physical item 604 may not yet be linked to an existing object stored in the virtual platform data 104. In these situations, the creation component 206 may take various actions to assist in creation of a corresponding virtual object. The creation component 206 may link an existing object with similar attributes, may auto-generate a virtual objects using imagery of the physical item 604, may generate a work-order for another creator to create a corresponding virtual object, and/or may take other actions to assist in creation of a corresponding virtual object, which may be used to carry out the process 600 as described herein.

Figure 7:
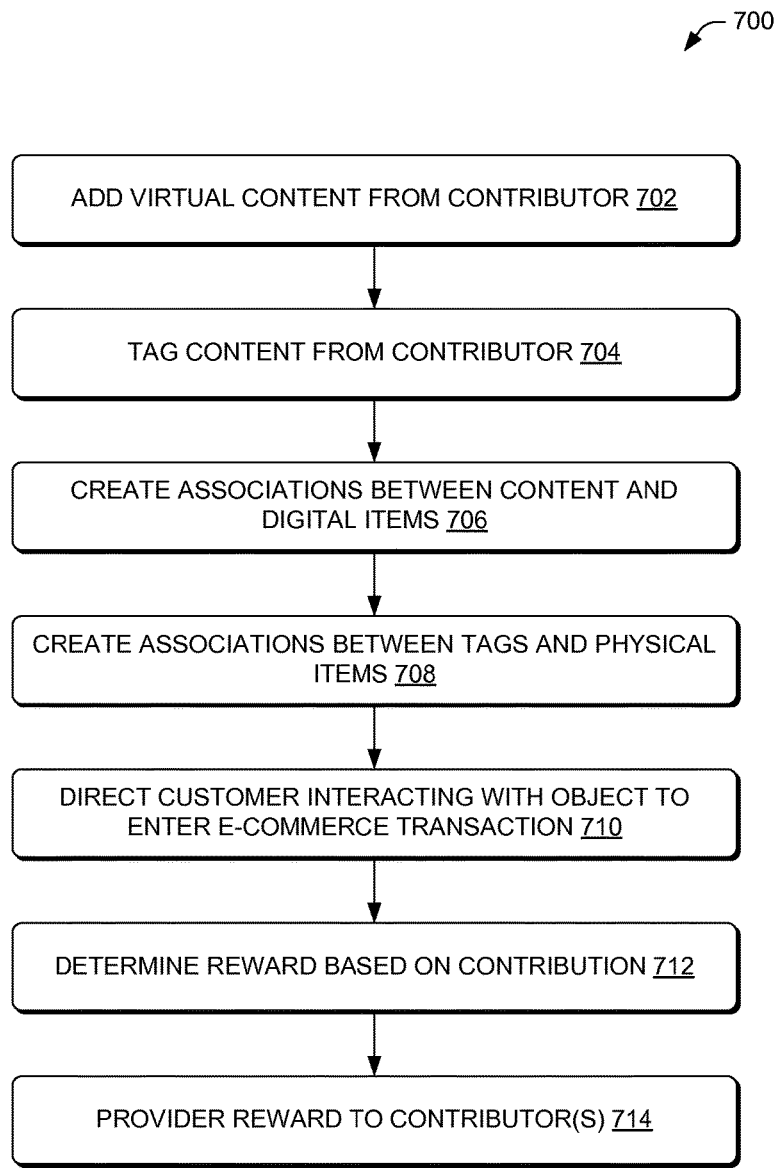
FIG. 7 is a flow diagram of an illustrative process to enable access to consumable items through the virtual world e-commerce platform and provide rewards to contributors that facilitate the access to the consumable items.

FIG. 7 is a flow diagram of an illustrative process 700 to enable access to consumable goods and services through the virtual world e-commerce platform and provide rewards to creators that facilitate the access to the consumable goods. The process 700 is described with reference to the environment 100 and the computing architecture 200, and may be performed by the virtual platform servers 102.

At 702, the creation component 206 may receive content created by contributors, professional designers, enthusiasts, and/or other users, which may be added to the virtual platform. The content may include a new virtual scene, new virtual objects that can be placed in a virtual scene, a new virtual world, and/or other modifications thereof.

At 704, the tagging module 212 may be used to add tags to the creation, such as tags to the virtual objects, the virtual scenes, and so forth. The tags may be selected automatically or based on input from the contributor, curators, and/or users.

At 706, the linking module 214 may create associations between the created content and digital items. For example, some digital items such as music, video, documents, games, other virtual content, and other digital items may be associated with virtual objects in the creation provided at the operation 702. The associations may enable access to the digital items within a virtual scene or outside of the virtual platform, such as by the e-commerce servers 116.

At 708, the linking module 214 may create associations between the created content and physical items. The physical items may be goods and/or services made available to the user in the real-world, such as a book, a vacation booking, a toy, and so forth. The associations may enable access to the physical items from outside of the virtual platform, such as by the e-commerce servers 116. For example, the user may select a virtual object that represents a couch that is offered for sale by an e-commerce marketplace. The virtual platform servers 102 may then direct the user, at least temporarily to a service offered by the e-commerce marketplace to enable the user to purchase the item. In some embodiments, the user may interact with the e-commerce marketplace while staying in the virtual platform, such as by conducting a transaction in the virtual platform for the couch.

At 710, in response to user interaction in a virtual scene and/or with a virtual object, the hosting component 218 may direct a user to enter an e-commerce transaction to obtain a digital item or a physical item. The transaction may be processed within the virtual platform or outside of the virtual platform, such as by the e-commerce servers 116. By engaging in the transaction, the user may then be granted access to a digital item within the virtual platform and/or outside of the virtual platform, or the user may obtain a physical item or physical service outside of the virtual platform.

At 712, the reward module 220 may determine a reward for the contributor based on the size, impact, and/or other metrics of the contribution. For example, if the contributor created a virtual scene and virtual objects in the scene that lead to a user making a purchase, the contributor may get a first reward. Another contributor that adds a virtual item to a library of virtual items, which is then used by another contributor in a virtual scene, which ultimately is associated with a sale, may get a second reward. For some sales, multiple contributors may get rewards, which may be the same reward or different rewards. The rewards may be credits, bonus features, ratings, reviews, tokens, money, and/or other types or rewards or combinations of rewards for different activities performed by contributing to the platform. In some embodiments, rewards may also be provided to users for exploring the virtual platform.

At 714, the reward module may issue the rewards to the contributor(s) associated with existence of the virtual scene, virtual objects, and/or other virtual elements that are associated with the sale, via the transaction from the operation 710.

Figure 8:
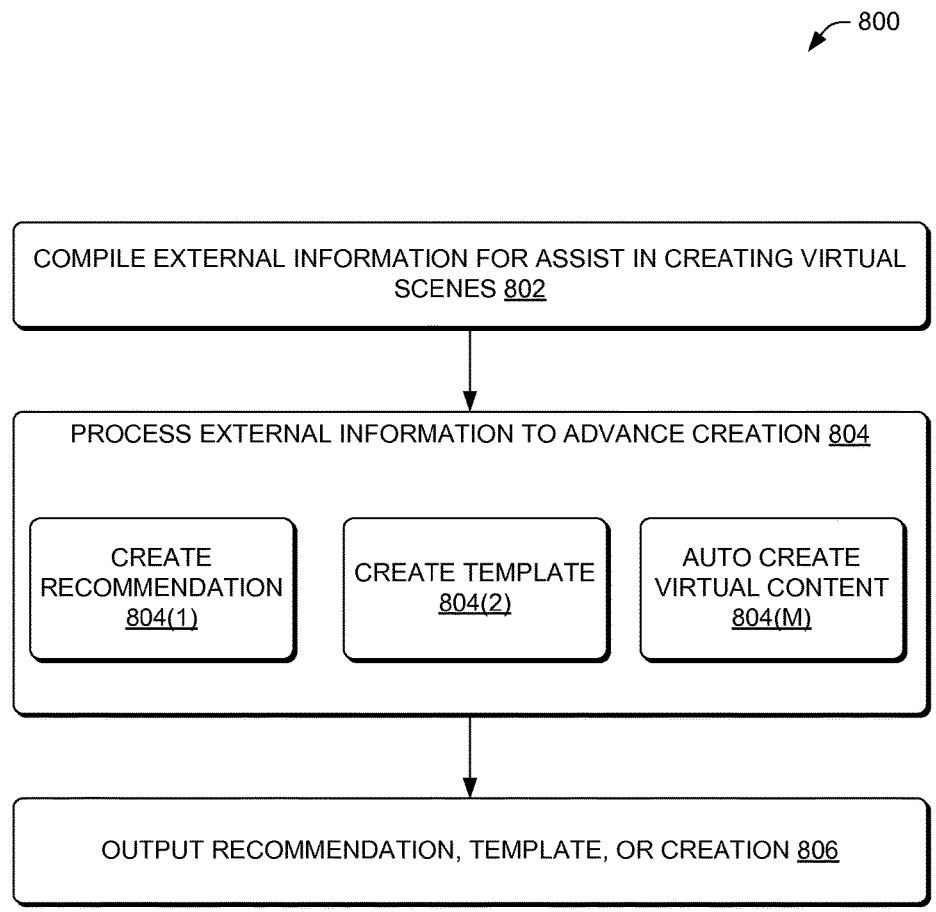
FIG. 8 is a flow diagram of an illustrative process to leverage external scene data sources to provide information to build virtual scenes and/or other virtual content.

FIG. 8 is a flow diagram of an illustrative process 800 to leverage the external scene data sources 226 to provide information to build virtual scenes. The process 800 is described with reference to the environment 100 and the computing architecture 200, and may be performed by the virtual platform servers 102.

At 802, the auto-create module 216 may compile at least some information from the external scene data sources 226. The information may relate to scenes from books, scenes from movies, scenes from plays, and/or other storylines, which may be used to create a virtual scene. The information may be used to create virtual objects, such as by providing rich descriptions of characters, objects, and environments from existing and well known media. An example one of the external scene data sources 226 may be a service that analyzes documents to identify associated attributes about characters, scenes, actions, and other attributes. These attributes may be used to create a specification sheet for a virtual scene and/or a virtual object, and/or may enable the auto-create module 216 to build such virtual content possibly by selecting existing virtual content from a library and possibly modifying some of the content to create new content.

At 804, the auto-create module 216 may process the external information to advance creation of virtual content using one or more of various techniques 804(1)-(M). At 804(1), the auto-create module 216 may create a recommendation, or specification sheet, for a virtual scene or virtual object. The recommendation may provide information to allow a creator to create the virtual scene or virtual object, such as by providing adequate description of the content of the virtual scene. At 804(2), the auto-create module 216 may create a template for a virtual scene or a virtual object. The template may include "roughing" in the objects, but may not result in a final product. For example, the template may include some existing objects from a library of objects, may be use placeholders for objects that are unavailable from the library. At 804(M), the auto-create module 216 may auto-create virtual content, such as by creating a complete or nearly complete virtual scene, a complete or nearly complete virtual object, or modifying existing virtual content accordingly.

At 806, the auto-create module 216 may output the recommendation, the template, and/or the creation from the operation 804. For example, created virtual scenes may be added to the virtual platform while created virtual objects may be added to virtual scenes and/or a library of available virtual objects. Templates and recommendations may be available for creators, professionals, enthusiasts, and users to further advance and/or complete creations for eventual publication in the virtual platform.

Figure 9:
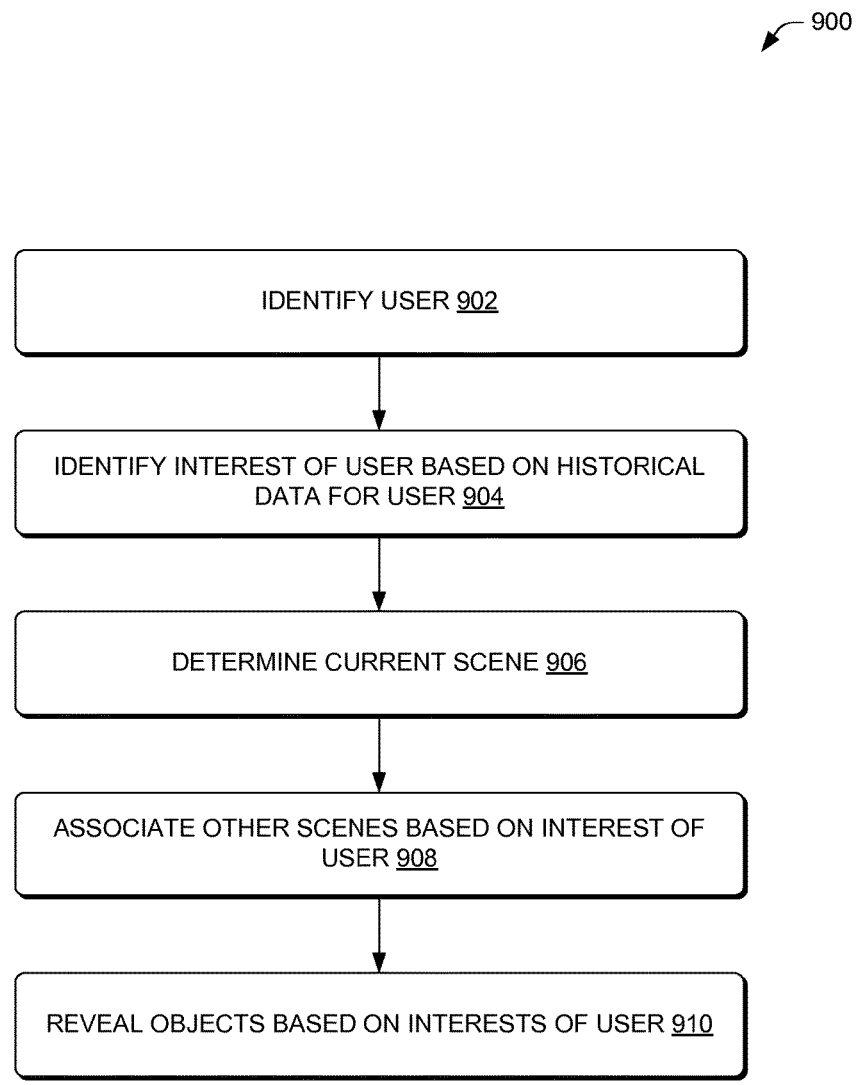
FIG. 9 is a flow diagram of an illustrative process to customize an experience in the virtual world e-commerce platform based on a profile of a user interacting with the virtual world e-commerce platform.

FIG. 9 is a flow diagram of an illustrative process 900 to customize an experience in the virtual world e-commerce platform based on a profile of a user interacting with the virtual world e-commerce platform. The process 900 is described with reference to the environment 100 and the computing architecture 200, and may be performed by the virtual platform servers 102.

At 902, the hosting component 218 may identify a user of the virtual platform. The hosting component 218 may identify the user based on use of an application registered by the user, a user authentication, and/or other identification information provided to the virtual platform servers 102. The hosting component 218 may also identify a portion of the user data 224 associated with the user identified at the operation 902.

At 904, the hosting component 218 may identify interests of the user based on historical data for the user stored in the user data 224 via a user profile. The user data 224 may store data from previous or current interactions with the virtual platform, as well as other data related to browsing history of content, transactions, user profile data, and/or other data, possibly aggregated from other servers (e.g., the e-commerce server 116, etc.).

At 906, the hosting component 218 may determine information about a current virtual scene visited by the user. For example, the hosting component 218 may determine tags associated with the virtual scene and tags associated with the virtual objects in the virtual scene.

At 908, the hosting component 218 and/or the linking module 214 may link or associate one or more recommended virtual scenes to the current virtual scene so that the user can visit the recommended virtual scenes while continuing exploration in the virtual platform, such as by continuing down a pathway during exploration. Thus, the virtual scenes available along a pathway may be dynamically assigned, linked, or otherwise made available for presentation to the user based on prior user activity. In this way, the user may continue to see more of the things that she likes and less of the things that she ignores or does not like.

The hosting component 218 may infer that a user likes something based on interaction, such as a selection of an object, time spent with an object or in a scene, and so forth.

At 910, the hosting component 218 may reveal objects based on interests of the user. For example, the user may enter a scene that is associated with many virtual objects. The hosting component 218 may filter out some of the virtual objects such that the hosting component 218 only renders some of the virtual objects, which are ones likely to be of interest to the user based on the user's historical data, interaction during a current session in the virtual platform, and so forth. User data may have a use-life and thus more recent historical data may be weighted more heavily that older historical data, such as by giving much greater weight to activities in a current session of interaction in the virtual platform.

Figure 10:
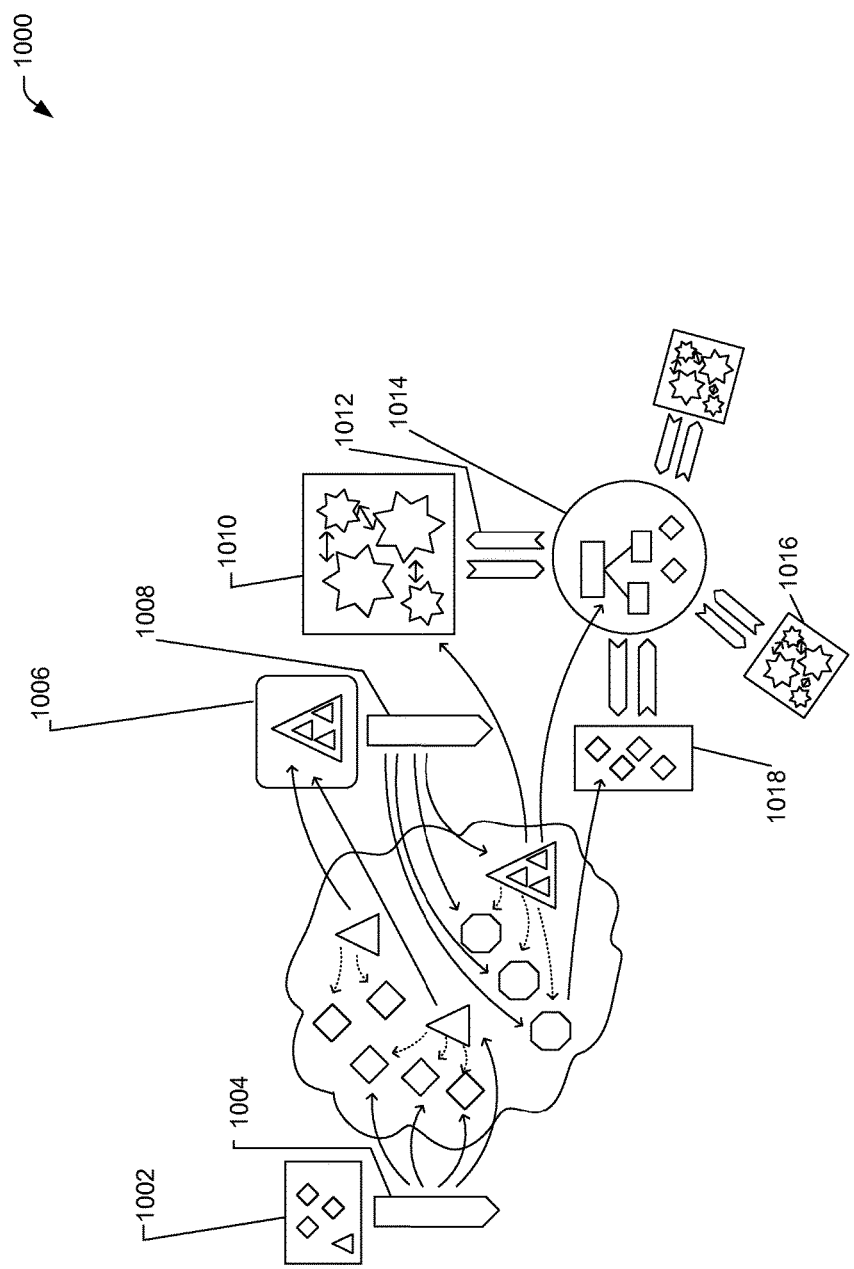
FIG. 10 is a schematic diagram of various components that interact to support the virtual world e-commerce platform.

FIG. 10 is a schematic diagram of various components that interact to support an illustrative virtual world e-commerce platform 1000. A virtual object application 1002 may contain code and resources to provide virtual content (e.g., virtual objects, etc.). For example, the code and resources may include meshes, textures, and other information to populate a virtual library of virtual object data and/or other data. A virtual object application ingestion module 1004 may extract manifest and resources from a package and convert the information to system formats, sizes, and so forth to enable use in the virtual platform. A world editor 1006 may select virtual object applications from a marketplace or library and configure the virtual object application. For example, the configuration may include positioning objects, associating objects with virtual scenes, and so forth. A world save module 1008 may merge resources into bundles. The bundles may be world specific or shared with other worlds. The bundles may be optimized for different devices, different users, and/or include other optimizations. An active world host 1010 may load saved worlds when visited by users. The active world host 1010 may run the virtual world's virtual object applications, and may perform message dispatching, which may cause rendering of virtual content. A message stream 1012 may update rendered state of objects. The message stream 1012 may also notify objects of events, such as interactions by user, updates to tags, and so forth. A scene composer 1014 may be used for a user device to provide custom content to that device. The scene composer 1014 may translate a scene into graphic primitives and translate user actions into virtual world events. The scene composer 1014 may stream cloud rendered content and may publish generated resources to the device. The scene composer 1014 may also compose multiple worlds for portals which a user may explore through contiguous regions of larger worlds. An avatar module 1016 may track movement and interaction by avatars in the virtual platform, when the virtual platform uses avatars. The avatars may be virtual object application, which include animation, clothing, attachments, and other attributes, which may act as links just like other virtual objects. For example, an avatar could be a link to a physical action figure, or a virtual shirt could link to a scene from a movie where a character is wearing that shirt, etc. A viewer module 1018 may load and cache a resource bundle and render graphic primitives. The viewer module 1018 may translate user input into actions in the virtual platform to enable user exploration of virtual content, such as the virtual worlds, virtual scenes, and virtual objects.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system hosting a virtual world electronic commerce (e-commerce) platform, the system comprising:
   one or more processors;
   a creation component including computer-executable instructions that, when executed, cause the one or more processors to perform acts comprising:
      receiving a virtual scene for rendering in a virtual world, the virtual scene associated with at least some content from a book and comprising an interactive media file that facilitates three-dimensional virtual exploration by users that access the virtual world through the virtual world e-commerce platform, the virtual world being a collection of virtual scenes;
      determining a virtual object for placement within the virtual scene, the virtual object being a virtual electronic book that provides a sample of content of an electronic book available for purchase;
      associating a tag with the virtual object, the tag including metadata that describes attributes of the virtual object, including text displayed on a cover of the virtual electronic book;
      identifying a real-world item offered for sale using the tag and a textual description of the real-world item, the real-world item including the electronic book and the textual description including at least a title of the electronic book that corresponds to the text displayed on the cover of the virtual electronic book;
      creating a link between the virtual object and the real-world item offered for sale to enable purchase of the real-world item via interaction with the virtual object; and
      creating an association between the virtual scene and a different virtual scene within the virtual world by mapping the tag from the virtual scene to a different tag associated with the different virtual scene; and
   a hosting component including computer-executable instructions that, when executed, cause the one or more processors to perform acts comprising:
      causing rendering of the virtual world to enable a user to explore the virtual scene;
      rendering the virtual scene for the user based at least in part on (i) a prior virtual scene visited by the user and (ii) user historical data representing interests of the user; and
      providing access by the user, in response to interaction with the virtual object, to at least one of (i) the sample of the electronic book through interaction with the virtual object or (ii) the real-world item offered for sale.

2. The system as recited in claim 1, wherein the creation component further includes computer-executable instructions that cause the one or more processors to perform acts comprising:
   accessing a textual description from the book;
   identifying the virtual object using the textual description from the book;
   selecting the virtual object for inclusion in the virtual scene; and
   causing the virtual object to be rendered in the virtual scene.

3. The system as recited in claim 1, wherein the providing the access includes transmitting information to a user device of the user, the information to connect the user device to an electronic marketplace that offers the real-world item for sale.

4. The system as recited in claim 1, wherein the different virtual scene includes at least one virtual item that is different from virtual items included in the virtual scene.

5. A method, comprising:
   generating a virtual world that includes multiple virtual scenes, a virtual scene of the multiple virtual scenes including a virtual object associated with a tag;
   sending the virtual scene to a device associated with a user profile based at least in part on an association between the tag and historical data representing prior interactions associated with the user profile;
   locating the virtual object within the virtual scene;
   associating the virtual object with a real-world item using the tag;
   creating a link that forms a virtual pathway between the virtual scene and a different virtual scene within the virtual world based at least in part on the association between the tag and the historical data associated with the user profile; and
   sending, in response to user interaction with the virtual object in the virtual scene, a request to a third party service for the real-world item associated with the virtual object, the teal-world item available for purchase from the third party service.

6. The method as recited in claim 5, further comprising accessing an additional virtual object to locate within the virtual scene, the additional virtual object being associated with an additional real-world item.

7. The method as recited in claim 5, wherein the different virtual scene includes at least one virtual item that is different from virtual items included in the virtual scene.

8. The method as recited in claim 5, further comprising receiving an indication that the real-world item was purchased, wherein the real-world item is at least one of a real-world physical good or a real-world service offered by the third party service.

9. The method as recited in claim 5, further comprising providing user access to a library of virtual objects for insertion within the virtual scene via a creation component.

10. The method as recited in claim 5, further comprising:
    providing, in response to user interaction with a different virtual object in the virtual scene, access to a digital item associated with the different virtual object; and
    causing playback of the digital item within the virtual scene via a virtual digital player.

11. The method as recited in claim 5, further comprising:
    associating the virtual object with multiple different tags; and
    generating a weight for each of the multiple different tags based at least in part on user interaction with the multiple different tags,
    wherein the associating the virtual object with the real-world item includes applying the weight for each of the multiple different tags as part of the associating.

12. The method as recited in claim 5, further comprising modifying the virtual scene by changing at least one attribute of the virtual object based at least in part on user input to enable customization of the virtual object.

13. The method as recited in claim 5, further comprising:
    receiving, from users, votes associated with the tag associated with the virtual object; and
    modifying an association between tag and the virtual object based at least in part on the votes.

14. The method as recited in claim 5, wherein the virtual world is a first virtual world, and further comprising providing a portal within the virtual scene to enable navigation to a second, different virtual world.

15. The method as recited in claim 14, further comprising:
associating a first group of real-world items with the first virtual world; and
associating a second group of real-world items with the second virtual world.

16. A system comprising:
one or more processors; and
memory to store computer-executable instructions that, when executed, cause the one or more processors to:
associate a tag with a virtual object, the tag including metadata to link the virtual object with third party content;
cause a virtual world to be rendered, the virtual world including multiple virtual scenes, wherein a virtual scene includes the virtual object associated with the tag;
create a link that forms a virtual pathway between the virtual scene and a different virtual scene within the virtual world based at least in part on the association between the tag and historical data representing interests of a user;
receiving, based at least in part on user interaction within the virtual world, a user input to select the virtual object; and
provide, in response to user interaction with the virtual object, access to information associated with a real-world item of the third party content that is associated with the virtual object.

17. The system as recited in claim 16, wherein computer-executable instructions further cause the one or more processors to reveal the virtual scene to the user based at least in part on an association between the tag and the historical data.

18. The system as recited in claim 16, wherein the different virtual scene includes at least one virtual item that is different from virtual items included in the virtual scene.

19. The system as recited in claim 16, wherein computer-executable instructions further cause the one or more processors to modify the virtual scene or the virtual object based at least in part on user input.

20. The system as recited in claim 16, wherein the real-world item is a real-world physical good or a real-world physical service offered by a third party service.

\* \* \* \* \*